Nov. 5, 1968  R. W. BUSHMEYER  3,408,923
METHOD FOR PROCESSING HAY WAFERS
Filed July 28, 1966
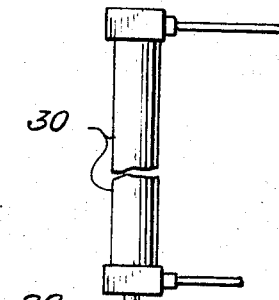
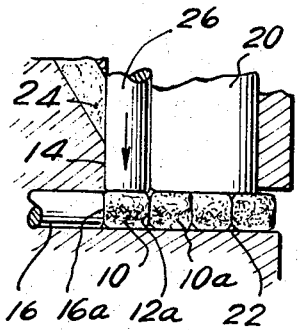
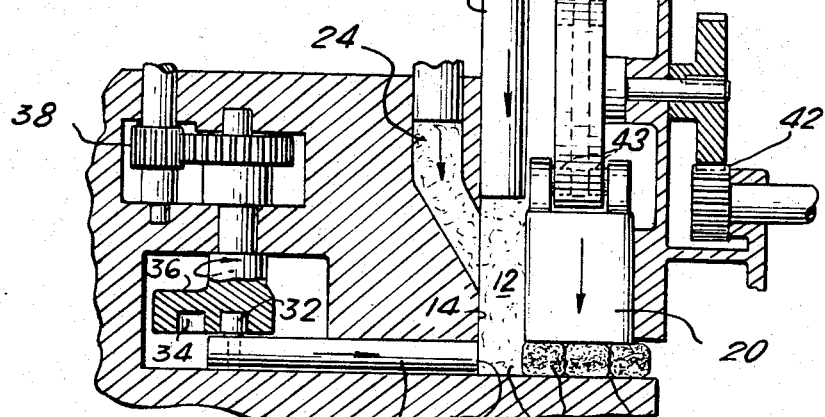
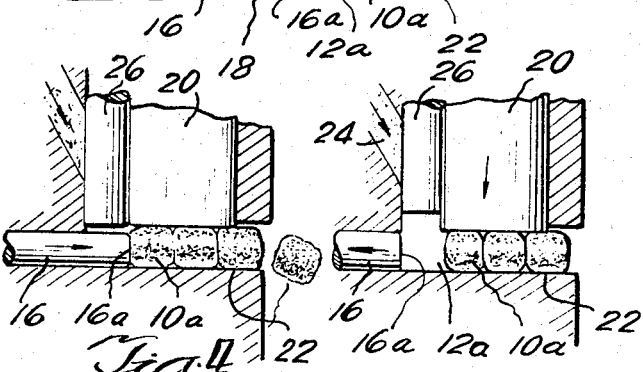
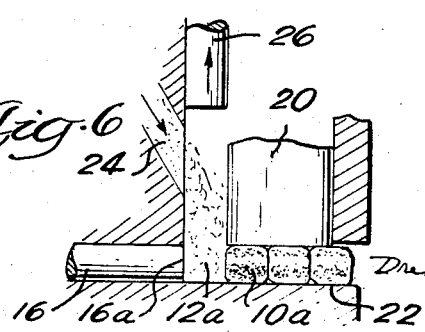
INVENTOR.
Richard W. Bushmeyer
BY
Dressler, Goldsmith, Clement & Gordon
Attorneys

3,408,923
METHOD FOR PROCESSING HAY WAFERS
Richard W. Bushmeyer, Rockford, Ill., assignor to J. I. Case Company, a corporation of Wisconsin
Filed July 28, 1966, Ser. No. 568,638
1 Claim. (Cl. 100—35)

ABSTRACT OF THE DISCLOSURE

A method for forming hay pellets, and the like, the method comprising using a forming chamber having an end wall with means of access for the hay which is to be compressed and a piston for converting the hay in the chamber into a wafer by pressing it against the end wall. A holding chamber is located adjacent the end wall and extends transversely away therefrom to the exterior of the machine. A transverse piston is present to push the wafers, after they are pressed, from the forming chamber into the holding chamber. One wall of the holding chamber consists of a retractable piston for pressing the wafers in the holding chamber to restrain them during the wafer forming step so as to block entrance to the holding chamber. The piston is timed to retract after the wafer has been formed in the forming chamber immediately prior to the time the wafer is moved from the forming chamber into the holding chamber to allow all wafers to be moved. The piston then extends again to restrain the wafers during the next compression step in the forming chamber.

---

This invention relates to the production of wafers from hay or other agricultural products and is particularly directed to a method for compacting hay into a highly dense wafer.

Hay wafering, or pelleting, as it is otherwise known, is a relatively new area of development for the agricultural industry of our country. It has long been the aspiration of farmers and livestock owners to obtain a dense wafer or pellet in place of the loose or partially compacted forage crops that have hitherto been tied into a relatively loose bale. It is obvious that a wafer having a relatively high density will substantially reduce the storage area necessary to store a given quantity of forage product. In addition, it makes handling much more convenient and carries with it a multitude of advantages which are obvious to the average farmer.

Heretofore, hay wafering has been essentially a stationary operation wherein the product is brought to a large machine and the hay or other product is formed into a wafer at the particular station. The process most commonly used has been the extrusion process wherein masses of material are extruded through an open-ended die in which the density of the product is substantially increased after which the wafer so formed is ejected from the machine. Extruder type machines have high horsepower requirements that necessitate the use of large engines which results in a very heavy piece of equipment. This has led the agricultural machine manufacturers toward stationary machines as distinguished from field machines which could go into the field and wafer the crop in situ.

It is recognized that field machines employing the extrusion process have been built but they have a number of disadvantages in that they are extremely bulky and heavy and thus present soil compaction problems with a resultant undesirable effect on the soil as the machines move through the field. Also such machines are limited in that they can only efficiently handle products in which the moisture content falls within a very narrow range.

The agricultural industry has long been waiting for a field type machine that is light in weight, efficient to operate and capable of producing wafers of the desired consistency. It is the lack of these desirable characteristics that prevent wafering equipment from becoming a mass produced universally accepted item on the order of the hay baler which was the first big advance in the storing and handling of forage products.

In accordance with the present invention I have provided a novel wafering method whereby forage products can be converted into dense wafers with a minimum power requirement thereby requiring the use of a relatively lightweight machine which can be driven through the field without presenting soil compaction problems. Briefly, apparatus that can be used to perform this method would employ a closed end compression chamber in which a charge of material is compressed by a piston requiring a minimum amount of power. It is appreciated that unless an accurate control is had of the material entering into the chamber that the density of the wafer would be somewhat inconsistent and in the event of an overcharge of material, could create damage to the machine unless provision was made to accommodate such an overcharge. This disadvantage is avoided by the instant invention by having one side of the compression chamber lead into a transversely disposed holding chamber wherein wafers previously formed are retained prior to their being ejected therefrom. This transverse holding chamber in effect forms an extrusion die so that in the event of slight overcharge in the chamber, any excess material located therein will extrude out into the holding chamber and thus damage to the machine will be avoided. The holding chamber is also designed so that the wafer is retained under compression for a sufficient period to insure that the wafer will retain its compressed form after being ejected from the holding chamber.

One wall of the holding chamber consists of a retractable piston which is timed to retract after the wafer has been formed and immediately prior to the time the wafer is moved from the compression chamber into the holding chamber. When the pressure on the piston is released, the wafer is moved by an ejection piston from the forming chamber into the holding chamber. The force acting on the wafers in the holding chamber is not completely released, but it is reduced enough to permit the wafer to be moved into one end of the holding chamber and another one to be moved out of the other end thereof. After the wafer has been introduced into the holding chamber the piston is again compressed to retain the wafers in place in the holding chamber.

Thus it can be seen that this process offers the advantages of an extruding type hay pelleter insofar as the ability to handle varying feed rates is concerned, but has very low horsepower requirements which are normally required with the extruding type of machine. In addition, it can be appreciated that with this process the former could handle forage products having a wide range of moisture conditions which is not available when one employs the extrusion principle.

Other advantages of the novel method and apparatus disclosed herein will be seen from the attached drawings and description thereof, in which:

FIGURE 1 is a schematic illustration of an apparatus that can be used to practice the method showing the apparatus positioned to receive a charge of hay;

FIGURE 2 is a view showing the hay in the forming chamber compressed into a wafer;

FIGURE 3 illustrates the position of the various mechanisms immediately prior to the time the wafer is ejected from the forming chamber;

FIGURE 4 shows the newly compressed wafer positioned in the holding chamber and a wafer being discharged therefrom;

FIGURE 5 is a view showing the ejection piston in the retracted position; and

FIGURE 6 shows the apparatus in position to receive a new charge of hay.

The apparatus shown in FIGURE 1 illustrates in schematic form various mechanisms that can be used to form a dense wafer in accordance with the novel method forming a part of the instant invention.

A wafer 10 is formed in a closed end compression chamber 12 into which the hay to be compressed is directed. The chamber 12 into which the hay is initially introduced is defined on one side by sidewall 14 and exposed end 16a of ejection piston 16, on its bottom by base 18, and on the other side by holding piston 20 and wafer 10a located in holding chamber 22. When the hay is introduced into the chamber 12 through feeding passage 24, the compression piston 26 located in chamber 12 is moved downwardly to compress the hay into a dense wafer 10 within a space 12a defined on its bottom by base 18, on its sides by piston end 16a and wafer 10a in holding chamber 22 and on top by compression piston 26.

When the wafer is to be formed, the compression piston 26 connected to piston rod 28 is driven downwardly through the action of hydraulic cylinder 30. In the event the chamber 12a has received an overcharge of material, the excess material will be extruded out into the holding chamber 22 formed between the piston 20 and the base member 18.

From the above, it can be appreciated that the forming of wafers by this method is not limited to crops having any specific moisture content and can be employed to handle various types of forage products.

The drives for the various pistons are shown schematically in FIGURE 1, which drives are timed to operate in the desired sequence which is set forth hereinafter when the complete method of operation is described.

As previously mentioned, the compression piston 26 is operated through the action of hydraulic cylinder 30. The ejection piston 16 which is used to move the wafer from the compression chamber 12a to the holding chamber 22 has secured to one end thereof a cam follower 32 which is located in a cam track 34 defined by the cam 36. The piston 16 is reciprocated by the action of cam 36 which is rotated by suitable gearing mechanism 38 connected to a driving means (not shown).

The holding piston 20 which serves to retain the wafer under compression for a given dwell time in the holding chamber 22 is reciprocated through the action of a cam member 40 that is driven by a gear mechanism 42. The holding piston has pins 43 secured to its upper end which fits within the cam 40 and is designed so that rotation of cam 40 results in limited reciprocation of holding piston 20. The holding piston is moved a very limited amount and is effective to relieve the load on the wafers in the holding chamber when a wafer is to be ejected from the compression chamber 12a thus requiring a minimum amount of power to accomplish this step. The holding piston normally does not separate from the compressed wafers 10 in the holding chamber.

The method of operation can be seen by following the sequence of steps set forth in FIGURES 1 through 6. In FIGURE 1, the pistons 26, 16 are positioned to permit a charge of hay to be admitted into the forming chamber 12 through passage 24. After the hay has been so disposed, the compression piston 26 is moved into the position shown in FIGURE 2 wherein a dense wafer 10 is now formed in the chamber 12a. After the wafer has been formed, compression piston 26 and holding chamber piston 20 are moved slightly upward to permit the ejection piston 16 to move the wafer 10 from the compression chamber 12a into the holding chamber 22 with a minimum amount of force. The movements of the various pistons are synchronized so that the ejection piston will eject the wafer into the holding chamber 22 after the holding piston and compression pistons have been raised a slight amount. The holding chamber piston remains in contact with the wafers, but under a reduced pressure to thus facilitate ejection of the wafer into the holding chamber. With the introduction of the newly formed wafer into the holding chamber, the wafer located at the open end of the holding chamber will be forced out into any suitable receptacle. It is noted that the holding chamber can be made as long as desired to provide for the desired amount of dwell time to permit forming and setting of the wafer.

After the wafer has been ejected from the compression chamber, the ejection piston is withdrawn, as shown in FIGURE 5. The compression piston is subsequently withdrawn, as illustrated in FIGURES 5 and 6, and the holding chamber piston is reactivated to compress the wafers located in the holding chamber. The apparatus is thus in position to receive a subsequent charge of hay.

It can be appreciated that many changes can be made in the apparatus to accomplish the method so disclosed and the apparatus is merely intended to be exemplary. For example, any of a variety of types of drive mechanisms could be employed to accomplish the synchronized movement required to perform the novel method, while the holding chamber could be made divergent, in which situation it would not be necessary to provide a retractable holding piston.

What is claimed is:

1. The method of compacting material to form a wafer comprising the steps of introducing material to be compacted into a forming chamber having an end wall and opening into a holding chamber which contains an adjacent, previously-formed wafer; compressing the material to be compacted in said forming chamber against said end wall to substantially form the wafer into its finished density while holding said adjacent, previously-formed wafer under compression force directed transversely to the axis of the holding chamber to prevent the wafer from moving; releasing the compression force on the adjacent, previously-formed wafer; and ejecting the newly formed wafer from said forming chamber into the holding chamber.

References Cited

UNITED STATES PATENTS

| | | | |
|---|---|---|---|
| 657,607 | 9/1900 | Luzatto. | |
| 1,490,162 | 4/1924 | Dow. | |
| 2,296,516 | 9/1942 | Goss | 18—5 |
| 3,030,876 | 4/1962 | Searles | 100—232 XR |
| 3,090,182 | 5/1963 | Johnson et al. | 56—1 |
| 3,186,360 | 6/1965 | Forth et al. | 107—14 |

BILLY J. WILHITE, *Primary Examiner.*